United States Patent [19]

Usui et al.

[11] Patent Number: 5,173,471
[45] Date of Patent: Dec. 22, 1992

[54] EXHAUST GAS CLEANING DEVICE

[75] Inventors: Masayoshi Usui; Yuzo Hitachi, both of Shizuoka, Japan

[73] Assignee: Usui Kokusai Sangyo Kabushiki Kaisha, Shizuoka, Japan

[21] Appl. No.: 703,115

[22] Filed: May 20, 1991

[30] Foreign Application Priority Data

May 25, 1990 [JP] Japan .................................. 2-134180
May 25, 1990 [JP] Japan .................................. 2-134181

[51] Int. Cl.$^5$ .......................... B01J 35/04; B32B 3/12
[52] U.S. Cl. .................................. 502/439; 502/527; 428/593
[58] Field of Search ................. 502/439, 527; 428/593

[56] References Cited

U.S. PATENT DOCUMENTS

| | | | |
|---|---|---|---|
| 4,822,766 | 4/1989 | Cyron et al. ......................... | 502/439 |
| 4,931,421 | 7/1990 | Shibata ................................ | 502/439 |
| 5,011,810 | 4/1991 | Michimoto et al. ................. | 502/439 |
| 5,026,611 | 6/1991 | Usui et al. ........................... | 502/439 X |

Primary Examiner—W. J. Shine
Assistant Examiner—Douglas J. McGinty
Attorney, Agent, or Firm—Lowe, Price, LeBlanc & Becker

[57] ABSTRACT

A metal-made honeycomb body, which is an important component of an exhaust gas cleaning device, is composed of at least one heat-resistant, planar band and at least one heat-resistant, corrugated band. Of these bands, each corrugated band has, on at least a part of a surface thereof, a surface-roughened area defining a number of minute pits.

12 Claims, 5 Drawing Sheets

EXHAUST GAS CLEANING DEVICE

BACKGROUND OF THE INVENTION

1) Field of the Invention

The present invention relates to an exhaust gas cleaning device constructed of a metal-made honeycomb body for carrying an exhaust gas cleaning catalyst. As a cleaning means for exhaust gas from a motor catalyst, the exhaust gas cleaning device is generally installed at an intermediate point of an exhaust pipe.

More specifically, the present invention is concerned with an exhaust gas cleaning device, of heat-resistant, planar and corrugated bands as constituent members of a metal-made honeycomb core body, at least the corrugated band defining minute pits in a surface thereof. Use of such a corrugated bands makes it possible to improve the joining strength of contact portions of both the bands, to say nothing of the retainability of the waveform of the corrugated band in the course of production of a honeycomb body and also the productivity of the honeycomb body.

2) Description of the Related Art

Exhaust gas cleaning devices of the above sort have conventionally been fabricated in the following manner. Namely, a planar band made of a heat-resistant steel sheet and a corrugated band obtained by forming a similar steel sheet into a wavy form are superposed one over the other in a contiguous relation. They are rolled together into a multi-layered spiral form of many elements, each of which is composed of such planar and corrugated bands, and stacked one over another in layers, thereby forming a honeycomb shaped multi-layered composite body (hereinafter called the "honeycomb core body") axially defining a number of network-patterned gas flow passages (hereinafter called the "cells") for allowing exhaust gas to axially flow therethrough. The honeycomb core body is then inserted into a cylindrical metal casing which is open in both ends thereof.

There is however a recent move toward constructing an exhaust gas cleaning device without any separately-fabricated metal casing, in other words, with a metal-made honeycomb core body alone from the standpoint of the price competition with conventional cordierite ceramic carriers. The omission of such a metal casing can of course save the cost for the production of the metal casing and also the cost required for inserting a metal-made honeycomb core body in the metal casing and then uniting them together, namely, the so-called canning cost, whereby a substantial cost merit can be brought about accordingly.

In a metal-made exhaust gas cleaning device of this sort, the honeycomb core body, the metal casing as well as the planar band and the corrugated band, said bands constructing the honeycomb core body, are firmly united together by welding, brazing, mechanical joint means or the like so that they can withstand, for example, thermal expansion and thermal stress—which are developed by the high temperature of exhaust gas itself and exothermic reactions of exhaust gas, said reactions being induced by a cleaning catalyst (Pt, Pd, Rh or the like) supported on wall surfaces of the honeycomb body—or vibrations while an automotive vehicle on which the device is mounted is running.

A honeycomb core body, which is a principal component of an exhaust gas cleaning device of this sort as described above, is produced from heat-resistant steel sheets, more specifically, by forming a hoop of a desired width, namely, a planar band, for example, from a heat-resistant Fe-Cr20%-Al5% of 0.03–0.1 mm in thickness (or a heat-resistant stainless steel obtained by adding one or more rare earth metals to the former stainless steel to improve the oxidation resistance)—and corrugating such a planar band into a corrugated band and then superposing these bands one over the other in a contiguous relation.

In a process for the production of a honeycomb core body, for example, when a rolled honeycomb core body is produced by superposing a planar band and a corrugated band one over the other in a contiguous relation and then rolling the thus-superposed bands together into a multi-layered, spiral form, the most serious problem is that the waveform retainability (rigidity) of the corrugated band is overcome by rolling stress and many network-patterned gas flow passages (cells) formed after the completion of the rolling, said passages being adapted to permit passage of exhaust gas, become uneven. The cells therefore are in both shape and density, fail to efficiently produce a uniform honeycomb core body. There is thus no choice other than setting the rolling speed at a relatively low level and producing honeycomb core bodies under conditions which do not deform their waveform.

The above problem also arises in the case of stacked honeycomb core bodies and S-shaped honeycomb core bodies. A stacked honeycomb core body is produced by stacking many elements, each of which has been formed by superposing a planar band and a corrugated band one over the other in a contiguous relation, one over another in layers. On the other hand, an S-shaped honeycomb core body is produced by stacking such elements in layers such that planar bands define outermost surfaces respectively, and then by bending the thus-stacked elements about two fixed axes chosen on the upper and lower outermost surfaces respectively, such that each of the elements presents a substantially S-shape. There is another drawback in that, because external stress is applied in the course of production of the honeycomb bodies of the various types or upon their enclosure within casings, their waveforms are prone to deformation.

The low waveform retainability (rigidity) of the corrugated band during production of the honeycomb core body as described above has led to a significant disadvantage in the performance of the exhaust gas cleaning device. Non-uniformity in the shape and/or density of cells brings about serious problems such that the pressure loss of exhaust gas becomes substantial, resulting in lowered engine efficiency and also in failure to maintain uniform cleaning ability for exhaust gas.

OBJECTS AND SUMMARY OF THE INVENTION

The present invention has been completed to overcome the above-described drawbacks of the honeycomb core bodies which have heretofore been employed as principal members of exhaust gas cleaning devices.

To overcome the drawbacks described above, the present inventors have proceeded with an investigation with a view toward improving the waveform retainability (rigidity) of a corrugated band which forms a honeycomb core body. The present inventors conducted the investigation so as to simultaneously achieve an improvement in the joining strength between a planar band and a corrugated band, said joint strength being required for honeycomb core bodies of the present type.

As a result, the present inventors have found that when a surface of at least a corrugated band out of a planar band and the corrugated band forming a honeycomb core body is roughened to form minute pits of a particular average depth, the corrugated band can exhibit sufficient waveform retainability (rigidity) against external stress applied during the production process of the honeycomb core body. As a result the planar band and corrugated band can be brazed together with sufficient strength at points of contact therebetween after the formation of the honeycomb core body, so as to lead to completion of the present invention.

In one aspect of the present invention, there is provided an exhaust gas cleaning device constructed of a honeycomb core body which has been formed by stacking at least one planar band made of a metal sheet and at least one corrugated band made from another metal sheet one over the other in a contiguous relation, so as to define a number of network-patterned gas flow passages in an axial direction. The corrugated band has on at least a part of a surface thereof, a surface-roughened area defining a number of minute pits having an average depth of 5–50 μm.

Owing to the above construction, the exhaust gas cleaning device according to the present invention exhibit the following great advantages:

(1) Upon production of a honeycomb core body, a corrugated band is especially prone to deformation due to external stress applied thereto. Owing to the present invention, the waveform retainability (rigidity) of the corrugated band has been enhanced and improved. Use of one or more planar bands and one or more corrugated bands therefore makes it possible to produce, with high productivity, various types of honeycomb core bodies with network-patterned gas flow passages (cells) having the same shape and the same density of formation. Needless to say, the uniformity in shape and formation density of the cells is preferred from the standpoints of the efficiency of an engine, the cleaning ability for exhaust gas, etc.

(2) In an exhaust gas cleaning device of the above sort, especially in a honeycomb core body which is a principal component, strong joining of a planar band and a corrugated band at points of contact therebetween is required in order to allow the honeycomb core body to withstand its use over a prolonged period of time under severe use conditions. In the present invention, the roughened area formed on a surface of the corrugated band, said area containing minute pits, allows a fused brazing filler material to efficiently penetrate under capillary action into the inside of each point of contact between both the bands. Both the bands are therefore brazed together strongly. Moreover, it is possible to suppress or prevent a reaction between the brazing filler material applied to each point of contact and an exhaust gas cleaning catalyst subsequently coated and supported, to achieve high catalytic activity.

Further, formation of communication holes in the corrugated band can bring about the following advantages:

(3) Since the temperature distribution and temperature gradient inside the honeycomb core body can be made uniform in a short period of time, the reaction between exhaust gas and the cleaning catalyst can be conducted under uniform conditions. Stable cleaning performance is therefore achieved.

(4) Owing to the uniform flow velocity distribution of streams of exhaust gas inside the honeycomb core body, the catalytic ability of the supported cleaning catalyst can be fully utilized. Stable cleaning ability can also be achieved as the amount of exhaust gas to be brought into contact with a unit amount of the catalyst can be made constant.

(5) In relation to the above advantages (3) and (4), the temperature distribution inside the honeycomb core body can be rendered more uniform, especially if the honeycomb core body is of the S-shaped type. It is therefore possible to effectively prevent separation at points of contact between the honeycomb core body and the cylindrical metal casing and separation between the honeycomb body and the metal casing at areas adjacent to the points of contact between the honeycomb body and the cylindrical metal casing and also cracks and breakage of the members (the planar band and the corrugated band) of the honeycomb core body, which cracks and breakage may be induced by such separation of the honeycomb core body from the metal casing and vice versa.

DETAILED DESCRIPTION OF THE INVENTION

Figure 1:
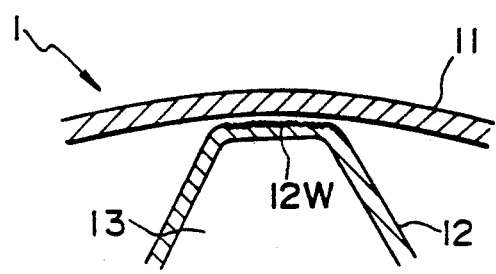
FIG. 1 is an enlarged, fragmentary, cross-sectional view of a planar band and a corrugated band in an exhaust gas cleaning device according to a first embodiment of the present invention, showing the planar band and corrugated band at a point of contact therebetween.

Technical features of the present invention will hereinafter be described in detail.

The greatest feature of the present invention resides in that drawbacks of a honeycomb core body as a principal component of an exhaust gas cleaning device, said drawbacks being especially those brought in from its production process, can be overcome to provide a honeycomb core body capable of showing excellent properties.

The most serious drawback brought in from the production process of such a honeycomb core body can be attributed especially to the low waveform retainability (rigidity) of a corrugating band out of a planar band and the corrugated band, which are both heat-resistant steel sheets and are members making up the honeycomb core body.

In order to improve the waveform retainability (rigidity) of the corrugated band, the present invention makes use of the technical approach that a honeycomb core body is constructed using a corrugated band whose surface has been roughened either partly or wholly. Needless to say, the term "a surface of a corrugated band" as used herein means its front side and/or its back side.

Based on the finding that the wetting property of a brazing filler material can be enhanced by the capillary action of minute concaves and convexes in such roughened surfaces when a corrugated band and a planar band are brazed together at points of contact therebetween into a honeycomb core body, the present invention also makes use of the technical approach that roughened areas formed in the surface of the corrugated band are chosen especially at areas where the corrugated band is brought into contact with the associated planar band, specifically at tops of the waveform of the corrugated band. In the present invention, the above-described surface-roughened areas to be formed in the tops of the waveform can be formed, for example, in either ridge parts or groove parts of the waveform at least where the corrugated band is brought into contact with the associated planar band.

An improvement in the joining strength at points of contact between the planar band and the corrugated band has an extremely important significance for the metal-made exhaust gas cleaning device. Accordingly, a description will next be made of this point.

The honeycomb core body which is a principal component of the metal-made exhaust gas cleaning device, tends to undergo substantial deformation in both the radial direction and the axial direction (i.e., the direction in which exhaust gas flows in and out, in other words, the direction in which exhaust gas passes) of the honeycomb core body in the high-temperature atmosphere that is developed by the high temperature of exhaust gas itself and also by heat generated as a result of catalytic reactions between exhaust gas and a catalyst layer.

In an exhaust gas cleaning device of this type, the honeycomb core body is exposed to high temperatures more in a central part than in a peripheral part because of the uneven distribution of the flow velocity of exhaust gas (the difference between the flow velocity in a central part and that in a peripheral part) and catalytic reactions (exothermic reactions) of exhaust gas, said reactions being induced by an exhaust gas cleaning catalyst supported on wall surfaces of the honeycomb core body, such as Pt, Pd or Rh. Incidentally, the temperature inside an exhaust gas cleaning device of this type generally ranges from 700°-800° C. but, where HC (hydrocarbons) is exhausted in a large amount, reaches as high as about 1200° C.

When the temperature gradient inside the honeycomb core body is investigated in more detail, it is appreciated that the temperature gradient between the peripheral part of the honeycomb core body and a part slightly inside the peripheral part is much greater than the temperature gradient near the central part. This tendency is increased further as the peripheral wall of the honeycomb core body is exposed directly to the external air or the honeycomb core body is fixedly secured within a cylindrical metal casing which is maintained in contact with the external air or, depending on the weather, is exposed to splashes of water.

In an exhaust gas cleaning device constructed of a honeycomb core body alone (i.e., of the type not using any metal casing) or an exhaust gas cleaning device constructed of a honeycomb core body and a metal casing, strong deforming force is therefore concentrated on a part of the honeycomb core body, said part being located in the proximity of the peripheral wall of the honeycomb core body, in particular, in its axial direction due to thermal expansion and thermal stress of the constituent members of the honeycomb core body.

Even when the constituent members (i.e., the planar and corrugated bands) are fixed together at the points of contact therebetween in the part located near the periphery of the honeycomb core body, the constituent members may separate from each other or develop cracks of breakage due to the above-mentioned deforming force as time goes on. At the same time, the central part of the honeycomb core body tends to outwardly extend while causing the planar band and the corrugated band to separate from each other. The outward extension of the honeycomb core body may also be called "telescoping" or "filming-out".

As described above, the planar band and the corrugate band, which in combination make up the honeycomb core body, tend to move relative to each other so that interlayer separation is induced. Once such separation takes place, the tendency of separation is increased under vibrations from the engine and road surface. Accompanied with the occurrence of such separation, the strength of the honeycomb core body is reduced and the planar and/or corrugated bands, which make up the honeycomb core body, are cracked or broken. These problems make the exhaust gas cleaning device unable to exhibit sufficient performance over a prolonged period of time.

The present invention has overcome the above-described problem of interlayer separation between the planar band and the corrugated band by the provision of mechanically-roughened areas on the surface of the corrugated band, said areas having been formed to improve the waveform retainability (rigidity) of the corrugated band, namely, by improving the wetting property of a brazing filler material to be employed to braze both the bands together (through the utilization of capillary action) and hence improving the joining strength between both the bands.

It is to be noted that the above-described improvement to the waveform retainability (rigidity) of the corrugate band is directly or indirectly achieved in the present invention by roughening at least a part of the surface of the corrugated band and forming minute pits there.

Consequently, the formation of minute pits in the surface of the corrugated band, for example, by machining making use of plastic deformation directly leads to enhancement of the rigidity of the corrugated band, whereby the above-described waveform retainability can be improved.

Even when the surface of the corrugated band is subjected to roughening, for example, by chemical etching or photoetching to define minute pits therein, the coefficient of friction of the corrugated band is increased so that deformation of the corrugated band is reduced during its stacking with the planar band, in other words, the waveform retainability of the corrugated band is indirectly improved.

To form the minute pits which in the surface of the corrugated band in accordance with the present invention, it is only necessary to roughen the surface to such extent that the waveform can be prevented from deformation against external stress to be applied in the course of the production process of the honeycomb core body. From the standpoints of the above-described waveform retainability (rigidity) and the penetration property of a brazing filler material to be employed upon brazing, the degree of surface roughness, namely, the average depth of minute pits may range from 5 $\mu$m to 50 $\mu$m and the density of formation of pits may be in a range of from 1 to $10^3$ pits per mm$^2$.

No particular limitation is imposed on the method for roughening the surface of the corrugated band to form minute pits therein. It is only necessary to perform the roughening of the surface, for example, by means of corrugation-forming gears having a surface with minute pits (hereinafter called "roughening, forming gears") or machining rolls (hereinafter called "roughening rolls" or by virtue of chemical etching or photoetching.

As a technique for preventing the catalytic activity from being lowered due to a reaction between the brazing filler material employed for brazing the corrugated band and the planar band, said bands making up the honeycomb core body, at the points of contact therebetween and a catalytic component to be coated and supported subsequently, Japanese Patent Application Laid-Open (Kokai) No. HEI 1-280613 proposes to form one or more recesses, more specifically one or more narrow grooves extending in the widthwise direction of the corrugated band in each top of the corrugated band, and coating the walls of each of the narrow grooves with a brazing filler material to hold the brazing filler material in place. The purpose of such narrow grooves is however different from that of the surface roughening applied in the present invention, because the surface roughening is applied to form minute pits such that the waveform retainability (rigidity) of the corrugated band can be improved. Further, the brazing in the present invention is facilitated by the penetration and spreading of the brazing filler material, said penetration and spreading being brought about by capillary action of the roughened surface. The narrow grooves are also different from the roughened surface from this point.

In the present invention, surface-roughened areas are formed to define minute pits in the corrugated band so that the drawbacks caused especially by insufficient waveform retainability (rigidity) of the corrugated band in the course of the production of the honeycomb core body can be overcome. Needless to say, such surface-roughened areas can also be formed on the side of the planar band. In such a case, from the viewpoint of increasing the coefficient of friction at points of contact between both the bands, it is preferred to form roughened areas on the planar band at locations where the planar band is brought into contact with the corrugated band. The roughened surface areas of the planar band can certainly improve the waveform retainability of the associated corrugated band when the superposed assembly of the corrugated band and the planar band is rolled together into a multi-layered composite body. This can also meet the desire that the joining strength at the points of contact between the corrugated band and the planar band should be enhanced. Namely, when the bands are brazed together at the points of contact therebetween, the wetting property of the brazing filler material is significantly enhanced by capillary action at the surface-roughened areas formed in the respective bands and uniform penetration of the brazing filler material into the areas of contact therebetween is promoted. This allows the brazing filler material to completely penetrate into the areas of contact between the bands, thereby making it possible to prevent formation of large fillets (balls of the brazing filler material) in the proximity of the points of contact and also reduction of the catalytic activity due to a reaction between the catalyst supported on band surfaces and the brazing filler material.

To reduce deformation force which is produced by large thermal expansion, thermal stress and the like developed inside the honeycomb core body, it is preferred to form communication holes in the corrugated band and/or the planar band, said bands forming the honeycomb core body, in particular, communication holes in the corrugated band in the present invention. Since the temperature is higher in the central part than in the peripheral part, this uneven temperature distribution inside the honeycomb core body triggers occurrence of thermal stress. It is therefore effective to outwardly distribute high-temperature exhaust gas from the central part by forming communication holes in the corrugated band such that gas flow passages extending from the central part of the honeycomb core body to the inner wall of the metal casing can be established. For this purpose, compared to a rolled-type or stacked-type honeycomb core body, an S-shaped honeycomb core body can achieve a uniform temperature distribution within an extremely short period of time and further can maintain the uniform temperature distribution, because the distance of spreading of the high-temperature exhaust gas from the central part to the inner wall of the metal casing through the communication holes is shorter in the S-shaped honeycomb core body than in the rolled-type or stacked-type honeycomb core body. The uniform temperature distribution leads to uniform catalytic reactions, further to uniform cleaning.

Certain examples of the present invention will hereinafter be described in further detail with reference to the accompanying drawings. It is to be noted that the present invention is limited neither to or by those to be described in the examples nor to or by those illustrated in the accompanying drawings.

Since the main feature of the present invention resides in the corrugated band which is a constituent member of the honeycomb core body, the corrugated band will be described primarily.

EXAMPLE 1

Reference is first had to FIG. 1, which is an enlarged, fragmentary cross-section showing the relation between a planar band 11 and a corrugated band 12 in a honeycomb core body 1 of an exhaust gas cleaning device A according to a first embodiment of the present invention, in particular, illustrating a point of contact between both the bands.

Figure 6:
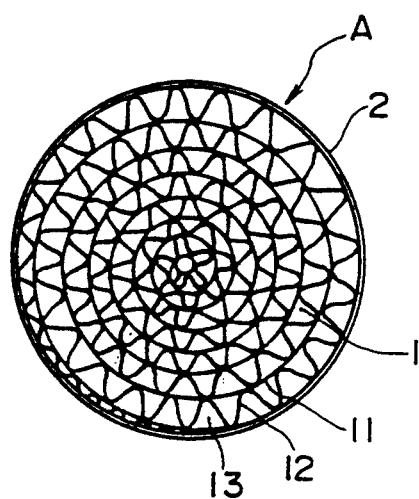
FIG. 6 is a front view of the exhaust gas cleaning device (rolled type) according to the first embodiment of the present invention.
Figure 7:
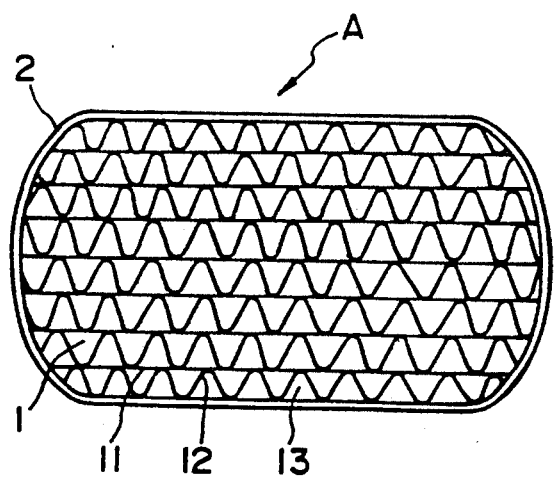
FIG. 7 is a front view of an exhaust gas cleaning device (stacked type) according to a second embodiment of the present invention.
Figure 8:
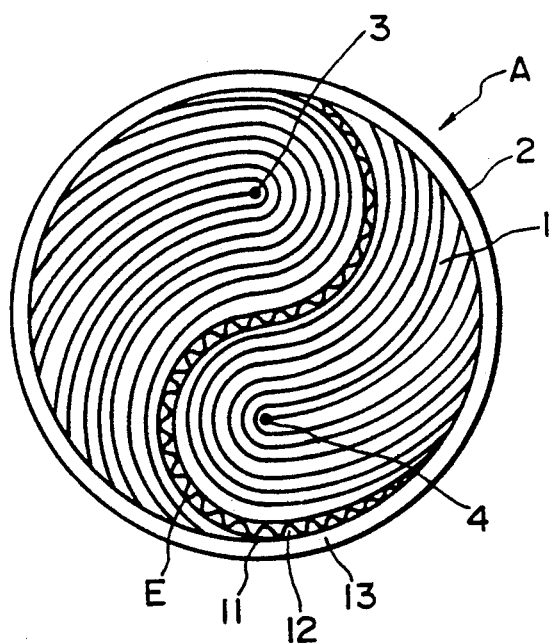
FIG. 8 is a simplified front view of an exhaust gas cleaning device (S-shaped type) according to a third embodiment of the present invention.

In the present invention, the exhaust gas cleaning device A can take various shapes, including, for example (1) as shown in FIG. 6, those having a rolledtype, honeycomb core body 1 in which a planar band 11 and a corrugated band are rolled into a spiral form, (2) as depicted in FIG. 7, those equipped with a stacked-type, honeycomb core body 1 in which planar bands 11 and corrugated bands 12 are alternately stacked one over another in layers, and (3) as shown in FIG. 8, those provided with an S-shaped, honeycomb core body 1 which has been formed by stacking elements, each of which is formed of a planar band and a corrugated band arranged in a contiguous relation, one over another in layers such that the outermost surfaces are formed of planar bands respectively, and then bending the thus-stacked elements about two fixed axes 3,4, which have been chosen on the upper and lower outermost surfaces, into a substantially S-shaped configuration so that each element E extends in opposite direction with respect to its corresponding fixed axis 3 or 4. Alternate stacking of both the bands 11,12 automatically forms flow passages (cells) 13 for exhaust gas.

Although the honeycomb core body 1 is fixedly enclosed within the metal-made, cylindrical casing 2 in each of FIGS. 6 through 8, the metal casing 2 can be omitted in the present invention. Further, the metal casing has a desired cross-sectional shape such as a racetrack, i.e., oval cross-section, an elliptical cross-section, a triangular or a circular cross-section.

As is shown in FIG. 1, the corrugated band 12 which defines a substantially trapezoidal wave has a surface-roughened area 12W in each portion where the corrugated band 12 is brought into contact with the associated planar band 11, namely, on each top of the wave. The surface-roughened area 12W includes minute pits. This surface-roughened area 12W can be formed by the method shown in FIG. 3 or FIG. 4. Needless to say, the corrugated band 12 can take any desired waveform such as a sinusoidal waveform or a rectangular waveform.

Figure 3:
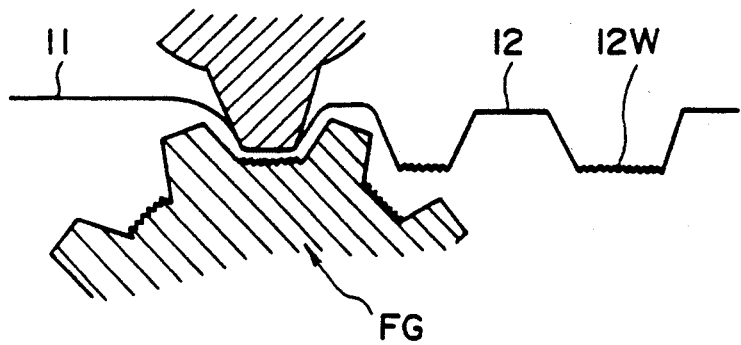
FIG. 3 illustrates a method for producing a corrugated band having surface-roughened areas.

Reference is next made to FIG. 3, in which a planar band 11 is corrugated by causing it to pass between forming gears arranged in combination. One of the gears, namely, the lower gear indicated at FG is, so that surface-roughened areas 12W can be formed simultaneously with corrugation machining.

Figure 4:
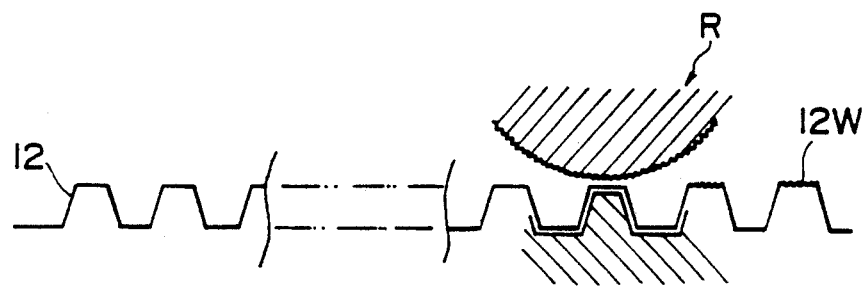
FIG. 4 shows another method for producing a corrugated band having surface-roughened areas.

Referring now to FIG. 4, two rolls are arranged in combination. One of the rolls, i.e., the upper roll indicated at R' is a surface-roughened roll. A surface-roughened area 12W can therefore be formed on the top of each ridge by causing a corrugated band 12 to pass between the rolls.

To form the surface-roughened area 12W in each top of the waveform of the corrugated band, namely, on each of the ridges and grooves of the corrugated band on the side where the corrugated band is brought into contact with the planar band 11, it is necessary to use, in combination, both the surface-roughening method shown in FIG. 3 and that illustrated in FIG. 4.

EXAMPLE 2

Figure 2:
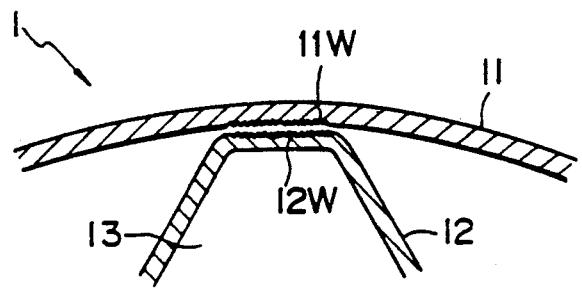
FIG. 2 is an enlarged, fragmentary, cross-sectional view of a planar band and a corrugated band in an exhaust gas cleaning device according to a second embodiment of the present invention, showing the planar band and corrugated band at a point of contact therebetween.

Reference is next had to FIG. 2, which is an enlarged, fragmentary cross-section showing the relation between a planar band 11 and a corrugated band 12 in a honeycomb core body 1 of an exhaust gas cleaning device A according to a second embodiment of the present invention, in particular, illustrating a point of contact between both the bands.

Figure 5:
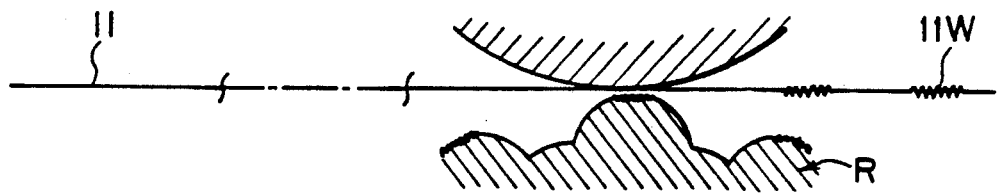
FIG. 5 is a method for producing a planar band having surface-roughened areas.

In the embodiment shown in FIG. 2, surface-roughened areas 11W are also formed on the side of the planar band 11. The planar band 11 having such surface-roughened areas 11W can be formed by the method shown in FIG. 5. Of two rolls arranged in combination, one of the rolls, namely, the lower roller designated at R defines alternate ridges and grooves in the circumferential wall thereof. The tops of the ridges are roughened. Surface-roughened areas 11W can therefore be formed by causing a planar band 11 to pass between the rolls.

EXAMPLE 3

Figure 9:
FIG. 9 is a cross-sectional view of a corrugated band which defines communication holes.
Figure 10:
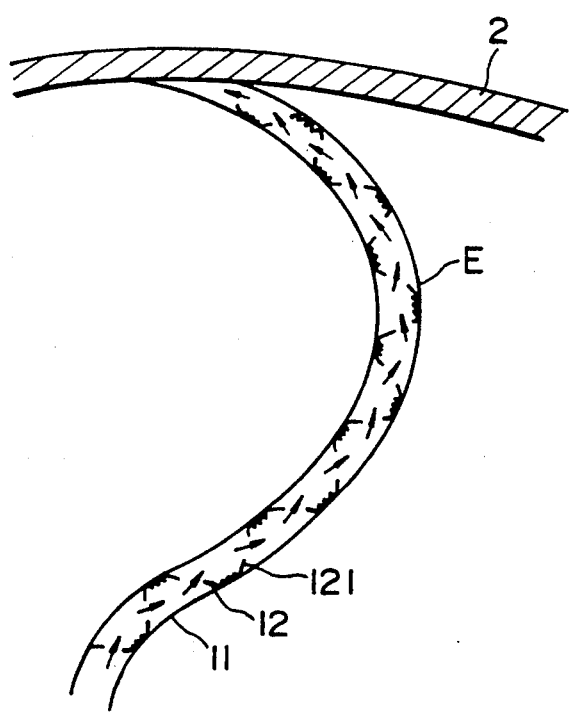
FIG. 10 schematically illustrates the manner of diffusion of exhaust gas through communication holes in a corrugated band in an S-shaped honeycomb core body.
Figure 11:
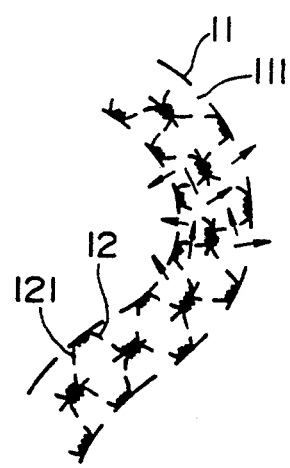
FIG. 11 schematically depicts the manner of diffusion of exhaust gas through communication holes in a corrugated band and also communication holes in an associated planar band in an S-shaped honeycomb core body.

Reference is next had to FIG. 9 to FIG. 11, in each of which a corrugated band and/or a planar band, said bands forming a honeycomb core body according to the present invention defines communication holes 111 and/or 121 in addition to the feature that surface-roughened areas are formed.

In FIG. 9, a corrugated band 12 defines, in addition to surface-roughened areas 12W, communication holes 121 which are open in the advancing direction of the wave from the leading end of the wave to the trailing end of the wave. FIG. 10 illustrates the manner of diffusion of exhaust gas from a central part toward a peripheral part through the communication holes 121 when corrugated bands 12 of the above-described type are used in an S-type honeycomb core body. It is to be noted that FIG. 10 shows only one element E. Further, FIG. 11 depicts the manner of diffusion of exhaust gas to a peripheral part of a honeycomb core body through communication holes 111,121 when corrugated bands 12 of the above-described type, said bands 12 defining the communication holes 121, are combined with planar bands 11 defining there communication holes 111 therethrough.

EXAMPLE 4

Exhaust gas cleaning devices A were produced in the following manner.

(a) Exhaust gas cleaning device with a rolled-type honeycomb core body (see FIG. 6):

Employed as a planar band was a heat-resistant steel sheet which contained 20% of Cr and 5% of Al and had a thickness of 0.05 mm and a width of 70 mm. Using a combination of forming gears one of which was surface-roughened at tooth-free circumferential wall portions to define minute pits of about 30 μm in depth as shown in FIG. 3, a corrugated metal band having a ridge-to-ridge width of 3.5 mm and a ridge height of 1.8 mm and presenting surface-roughened areas on tops of the ridges was formed from a heat-resistant steel sheet of the same type as the planar band. The planar band and the corrugated band were superposed one over the other and were then rolled together into a multilayered, honeycomb core body whose outer diameter was 70 mm.

During the rolling operation, the waveform of the corrugated band was not deformed so that a honeycomb core body having a uniform cell shape was obtained. Compared to conventional honeycomb core bodies having no surface-roughened areas, the shape retainability (i.e., the waveform retainability) was sufficient even when the rolling speed (productivity) was increased by 20% or so.

The honeycomb core body was next enclosed within a cylindrical metal casing having an inner diameter of 70 mm. Both end portions of the honeycomb core body, said end portions being about 10 mm in width from the corresponding ends, were dipped in a slurry bath of a Ni-base, high-temperature brazing filler material. After the brazing filler material was dried, the honeycomb core body was brazed in a vacuum heating furnace so that an exhaust gas cleaning device A was produced.

The exhaust gas cleaning device A produced as described above was subjected to a 50-cycle quickly heating and cooling test between room temperature and 900° C. and also to a vibration proof test. Neither separation nor breakage took place at the points of contact between the planar band and the corrugated band, so that the exhaust gas cleaning device A was found to be brazed firmly.

(b) Exhaust gas cleaning device with a stacked-type honeycomb core body (see FIG. 7):

Using planar bands and corrugated bands similar to those employed in the exhaust gas cleaning device (a), an exhaust gas cleaning device with a stacked-type honeycomb core body, such as that shown in FIG. 7, was produced. Like the exhaust gas cleaning device (a), the exhaust gas cleaning device (b) had a uniform cell shape and both the bands were firmly brazed.

(c) Exhaust gas cleaning device with an S-type honeycomb core body (see FIGS. 8-11):

Using planar bands and corrugated bands similar to those employed in the exhaust gas cleaning device (a), S-shaped honeycomb core body having a uniform cell shape was obtained without waveform deformation of the corrugated bands during the bending machining into the S-shaped configuration. Compared to conventional S-type honeycomb core bodies in which corrugated bands did not have any surface-roughened area, the waveform retainability was fully sufficient even when the rolling speed (productivity) was increased by 20% or so.

Like the exhaust gas cleaning device (a), brazing was conducted, and the resultant exhaust gas cleaning device was subjected to a burner spalling test and also to a vibration proof test. Exactly the same results as those obtained in the case of the exhaust gas cleaning device (a) were obtained.

The surface-roughened areas have been described to define a number of minute pits or concaves having an average depth of 5-50 $\mu$m. The surface-roughened areas can also be defined to include projections or convexes tions or convexes having an average height of 5-50 $\mu$m.

What is claimed is:

1. In an exhaust gas cleaning device constructed of a honeycomb core body which has been formed by stacking at least one planar band made of a metal sheet and at least one corrugated band made from another metal sheet one over the other in a contiguous relation to define a waveform having ridges and grooves and a number of network-patterned gas flow passages in an axial direction, the improvement wherein the corrugated band has, on at least a part of a surface thereof, a surface-roughened area defining a number of minute pits, wherein the corrugated band has the surface-roughened area on a surface of at least one of each ridge and each groove, said surface being in contact with the planar band, and wherein the surface-roughened area defines, per mm$^2$, 1-10$^3$ minute pits having an average depth of 5-50 $\mu$m.

2. The device of claim 1, wherein the planar band also has, on at least a part of a surface thereof, a surface-roughened area defining a number of minute pits having an average depth of 5-50 $\mu$m.

3. The device of claim 2, wherein the planar band has the surface-roughened area on a part thereof where the planar band in contact with the corrugated band.

4. The device of claim 1, wherein the honeycomb core body has been constructed by superposing a planar band and a corrugated band in a contiguous relation and then rolling the thus-superposed bands into a multi-layered spiral form.

5. The device of claim 1, wherein the honeycomb core body has been constructed by stacking planar bands and corrugated bands in a contiguous relation in layers.

6. The device of claim 1, wherein the honeycomb core body is an S-shaped honeycomb body formed by stacking elements, each of said elements comprising a planar band and a corrugated band arranged in a contiguous relation, one over another in layers such that planar bands define upper and lower outermost surfaces respectively, and then by bending the thus-stacked elements about two fixed axes chosen on the upper and lower outermost surfaces respectively, such that each of the elements presents a substantially S-shape.

7. The device of claim 1, wherein the corrugated band defines communication holes opening in the direction of from a leading end to a trailing end of the wave of the corrugated band.

8. The device of claim 1, wherein communication holes are formed through the planer band and corrugated band, respectively.

9. The device of claim 1, further comprising a metal casing in which the honeycomb body is fixedly secured.

10. The device of claim 9, wherein the metal casing has an circular cross-section.

11. The device of claim 9, wherein the metal casing has an oval cross-section.

12. The device of claim 9, wherein the metal casing has an elliptical cross-section.

* * * * *